(12) United States Patent
Sewell

(10) Patent No.: US 9,155,340 B2
(45) Date of Patent: Oct. 13, 2015

(54) RIDER AND PASSENGER STABILITY BELT

(71) Applicant: Donald B. Sewell, Louisville, KY (US)

(72) Inventor: Donald B. Sewell, Louisville, KY (US)

(73) Assignee: One Handit Bandit LLC, Louisville, KY (US)

( * ) Notice: Subject to any disclaimer, the term of this patent is extended or adjusted under 35 U.S.C. 154(b) by 0 days.

(21) Appl. No.: 14/190,234

(22) Filed: Feb. 26, 2014

(65) Prior Publication Data

US 2015/0237925 A1    Aug. 27, 2015

(51) Int. Cl.
| | |
|---|---|
| *A41D 13/00* | (2006.01) |
| *B62J 27/00* | (2006.01) |
| *A41F 9/00* | (2006.01) |
| *B60R 22/12* | (2006.01) |
| *B60R 22/32* | (2006.01) |

(52) U.S. Cl.
CPC ............ *A41D 13/0015* (2013.01); *A41D 13/00* (2013.01)

(58) Field of Classification Search
CPC .... A62B 35/00; A62B 35/0043; B60R 22/00; B60R 22/12; B60R 22/14; B60R 22/32; B60R 2022/008; B60R 2021/0088; A41F 9/002; A41F 9/005; B62J 27/00; B62J 2027/005; A41D 13/00; A41D 13/0015
USPC ............................. 2/300, 311, 321; 280/801.1
See application file for complete search history.

(56) References Cited

U.S. PATENT DOCUMENTS

| | | | |
|---|---|---|---|
| 2,435,428 A * | 2/1948 | Erbach et al. ................. | 451/442 |
| 3,487,474 A * | 1/1970 | De Meo ........................... | 2/311 |
| 3,533,107 A * | 10/1970 | Garbarino ........................... | 2/93 |
| 3,562,812 A * | 2/1971 | Greggains ........................... | 2/94 |
| 3,564,616 A * | 2/1971 | Battaglia .......................... | 2/311 |
| 3,840,902 A | 10/1974 | McNeill | |
| 3,896,499 A * | 7/1975 | Kelly ............................... | 2/311 |
| 3,930,667 A * | 1/1976 | Osuchowski et al. ....... | 280/730.1 |
| 3,940,166 A * | 2/1976 | Smithea .................... | 297/215.11 |
| 3,940,801 A * | 3/1976 | Riggs et al. ....................... | 2/311 |
| 4,028,742 A | 6/1977 | Marquis | |
| 4,413,358 A | 11/1983 | Jimenez | |
| 4,560,097 A * | 12/1985 | Reynolds et al. ............. | 224/160 |
| 4,685,151 A * | 8/1987 | Kincheloe .......................... | 2/456 |
| 4,746,084 A * | 5/1988 | Strong ...................... | 244/151 R |
| 4,759,311 A * | 7/1988 | Boyle ............................. | 119/857 |
| 5,076,598 A * | 12/1991 | Nauman ........................ | 280/202 |
| 5,081,719 A | 1/1992 | Donnelly | |
| 5,806,087 A * | 9/1998 | Grotefend .............................. | 2/1 |
| 5,896,590 A * | 4/1999 | Fleisch .............................. | 2/455 |
| 6,567,992 B2 * | 5/2003 | Ross ................................. | 2/311 |
| 6,651,594 B1 * | 11/2003 | Bagwell ......................... | 119/770 |
| 6,793,033 B2 * | 9/2004 | Yamazaki et al. ............. | 180/268 |

(Continued)

FOREIGN PATENT DOCUMENTS

| | | | | |
|---|---|---|---|---|
| JP | 2006008030 A | * | 1/2006 | |
| JP | 3119894 U | * | 3/2006 | |

*Primary Examiner* — Laura Freedman
(74) *Attorney, Agent, or Firm* — Cameron LLP

(57) ABSTRACT

A stability belt is fabricated of a spring-loaded safety belt buckle and a sufficiently long strap to reach around an operator and a passenger of an open vehicle or a domesticated animal. The stability belt may have a belt buckle that has a top quick belt release portion that comprises an aperture for receiving a tether. The tether is adapted to be tied to the buckle and the buckle released by pulling on the tether in the event of an emergency. The stability belt may have a padded portion at the rear and sides serving as a cushion for the passenger in the event of a quick stop. The stability belt may permit passengers to ride that otherwise would not be able to ride such as a small child or a handicapped person.

19 Claims, 5 Drawing Sheets

(56) References Cited

U.S. PATENT DOCUMENTS

| | | | |
|---|---|---|---|
| 7,370,887 B2 * | 5/2008 | Matsuo | 280/804 |
| 8,226,588 B2 * | 7/2012 | Horvath | 602/19 |
| 8,584,622 B2 * | 11/2013 | Nishino | 119/770 |
| 8,783,722 B1 * | 7/2014 | Gallo | 280/801.1 |
| 8,925,669 B1 * | 1/2015 | Saint-Hilaire | 180/219 |
| 2006/0254533 A1 * | 11/2006 | Fuller et al. | 119/770 |
| 2011/0154561 A1 | 6/2011 | Singhal | |
| 2011/0253130 A1 | 10/2011 | Yarnall | |

* cited by examiner

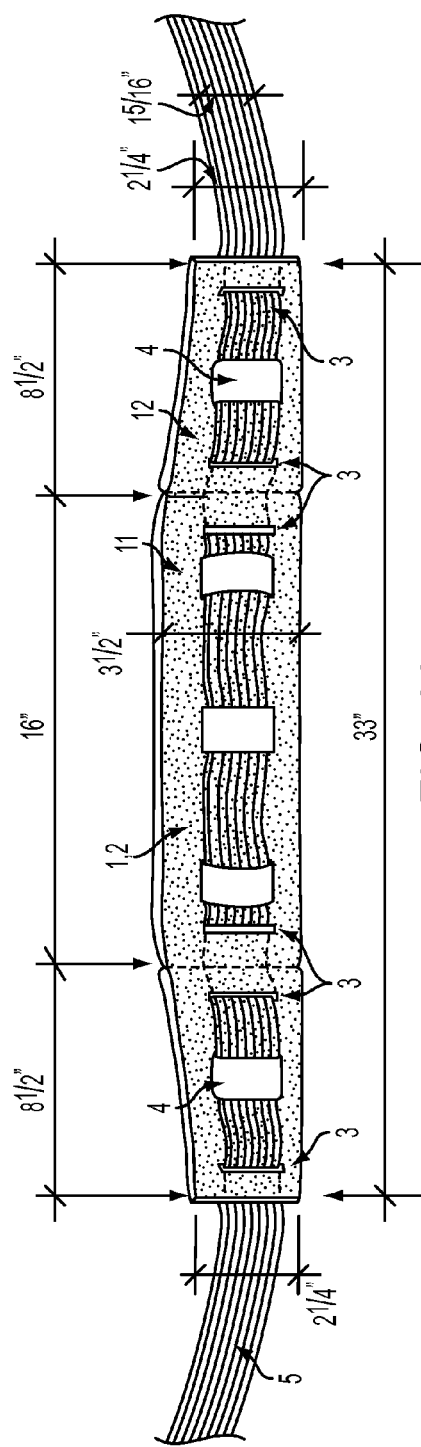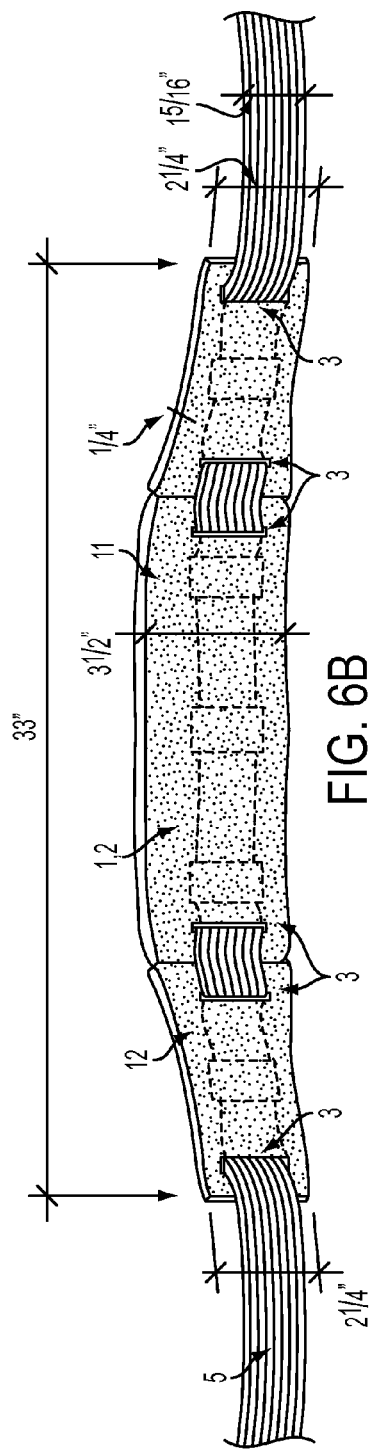

RIDER AND PASSENGER STABILITY BELT

FIELD OF THE INVENTION

The present invention generally relates to a stability belt for a rider and a passenger of an open vehicle or animal such as a horse and, more particularly, to a quick release stability belt that provides comfort, safety and stability for a vehicle driver or animal rider and an inexperienced or handicapped passenger of, for example, one of a motorcycle, motor scooter, snow mobile, jet ski, all-terrain vehicle, tractor or domesticated animal, such as a horse, camel, elephant, mule or donkey, such that the rider may use a tether to quickly release the belt from rider and passenger in the event of an emergency.

BACKGROUND

According to the Centers for Disease Control and Prevention, between 2001 and 2008, more than thirty-four thousand motorcyclists were killed and an estimated 1,222,000 persons were treated in a U.S. emergency department for a non-fatal motor-cycle-related injury. Helmets save lives. As of May 2012, nineteen states and the District of Columbia had universal helmet laws, twenty-eight states have a partial helmet law and three states had no helmet law. In Pennsylvania in 2010, of the 223 deaths in motorcycle accidents, two hundred two were drivers and twenty-one were passengers. In 2012 in Pennsylvania, of the two hundred ten people killed in motorcycle accidents, two hundred were operating the motorcycle and ten were passengers. Nearly half were not wearing helmets. About 36% of injured motorcyclists were not wearing helmets. From these statistics, one may conclude that passengers, not wearing helmets, are at risk when they ride a motorcycle and passengers are at risk, just as are drivers. The helmet appears to be a key to safety. On the other hand, there appears to be no data on the efficacy of any other safety or stability means for motorcycle passengers as to whether such means or devices save lives or provide for greater stability for passengers.

A safety belt for motorcycles is known from U.S. Pat. No. 3,840,902 of McNeill issued Oct. 15, 1974. The belt is securely fastened about the driver by a pair of buckles and a gripping means. The belt is further provided with windbreakers to cause wind flow to be less disturbing to a passenger. The belt has hand grips on each side for a passenger to hold on to. A cushion is provided in the rear of the bell to absorb sudden shocks.

Yet another motorcycle safety belt is shown and described in U.S. Pat. No. 4,028,742. The belt in fact comprises two belts placed across the chest and waist such that these two belts are parallel to one another and are suspended by suspenders. A back plate is added for back support. A passenger holds on to "resiliently mounted spaced apart" handles comprising first and second handles of the lower belt.

A further motorcycle safety belt is known from U.S. Pat. No. 4,413,358 to Jimenez issued Nov. 8, 1983. This safety belt is much like a known belt with belt holes and a buckle so that the belt may be buckled around a driver of variable waist sizes via the many belt holes. Handles are positioned on each side of the driver for a passenger/rider to hold on to. A widened portion in the rear makes the belt more comfortable.

Yet another motorcycle safety belt is disclosed by Donnelly in U.S. Pat. No. 5,081,719 issued Jan. 21, 1992. An advantage of this belt is a pair of slidable handles that may be moved about the belt. The handles are not in a fixed position. A belt web has first and second ends where the first end is a hook and loop style fastener to cooperate with a second hook and loop style fastener. The hook and loop fasteners cooperate further so that the overlap between the fasteners provides for varying waist sizes.

A motorcycle rider safety harness is shown in published U.S. Patent Application 2011/0154561 of Singhal published Jun. 30, 2011. The harness is inflatable and a plurality of air-bags can be inflated. A sensor can actuate the air bags automatically.

A biker's lap belt is shown in U.S. Published Patent Application 2011/0253130 published Oct. 20, 2011. As explained, a biker may utilize this belt around the biker's thighs to hold them together at a comfortable position. Biker's legs may tend to require back muscle exertion to maintain their tightness to hug the bike. A fifty-four year old biker found that the belt, when worn, reduced muscle fatigue. Such a belt is no assistance to a passenger.

Besides handles, there would appear to be a need in the open vehicle or ride-able animal arts to provide for stability and safety of a passenger. For example, a passenger may be a young child and not possess the strength to hold on to a handle or have the arm length to reach round the driver. A passenger may be a handicapped individual with no arm strength or be missing one or both of their arms. Handles on a rider belt would be of no assistance to a handicapped passenger with no arms or hands. Thus, there would appear to be a need in the art for improvements to permit a passenger to ride safely and with some enhanced stability behind a driver of an open vehicle or a ride-able animal such as a horse. Handles are insufficient, and there seems to be no data to support a proposition that handles on a belt will provide greater safety to a passenger.

Given the foregoing, what is needed is an improved belt that may provide for greater safety and stability for a passenger.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing a detailed description of an exemplary belt for both a driver (or principal rider) of an open vehicle and a passenger that may surround both the driver and the passenger. In the present application and claims, "driver" shall refer to a vehicle driver or the rider that is in control of a domesticated animal such as a horse, typically, referred to as a horseback rider (or other animal). The belt preferably is of such a length as to surround both the driver/principal rider and the passenger. It should effectively tie the driver to the passenger but in quick release form such as via a quick release, for example, a spring-loaded clasp and a clip similar in nature to a safety belt of an automobile. In an automobile, a seat belt ties the passenger or driver to the seat and may be a lap belt or, in modern vehicles, a chest and lap belt that automatically restricts forward movement on impact. In an embodiment of the present invention, the driver and passenger are tied together by a belt surrounding both of them. The strap of the belt may pass through a plurality of loops of one or more side and rear padding portions to make for a comfortable cushion for the passenger in the event of a quick stop. Also, the quick release clasp may be operated by a tether attached to the open buckle by an aperture suitably placed toward the outer edge, for example, between the midpoint of the top of the buckle (the spring-loaded release portion of the buckle) and the outer edge. The tether may be of any suitable material such as leather or plastic or rope and may be fitted with a loop at the opposite end from the buckle, quick release top so as to be worn in the hand of the driver or about the driver's arm. The driver only needs to move his hand slightly, perhaps an inch or two, or their arm (if tied to the arm), and the belt may be quickly released by the quick release buckle from both driver and passenger in the event of an emergency situation. The loop also is a means of holding on to the padded belt as the driver, in the emergency, may use the belt as a cushion for a safer landing as the driver is preparing to land from the emergency. The driver may release the belt from the passenger depending on the driver's assessment of an upcoming emergency. For example, motorcycle drivers have been known to be thrown over the handlebars of a motorcycle in an accident. The driver may form a diving position and allow the padded belt to shield their face or other unprotected portion of their body from impact on landing. Even a handicapped passenger or child may safely ride with the stability belt. The passenger, in the event of an accident, may then be freed from suffering the same fate as the driver.

A first prototype of the present invention comprises a rope or belt and a Styrofoam noodle found in swimming pools which are hollow to allow the rope to pass through the noodle. A father driver may take their five year old son for a ride on a motorcycle using such a quick release stability belt prototype with a padded noodle. The son may feel comfortable being close to his dad, and the father may feel more safe knowing his son, who may not be able to reach around his waist, is tied to him by the belt during riding. The noodle portion is floatable in the event of a water landing. In another exemplary situation, the rider may be handicapped and missing arm extremities or unable to use them. The stability belt of the present invention provides a means whereby someone that is handicapped may safely and with great stability ride and enjoy a motorcycle when the handicapped person may not otherwise be able to do so. A further exemplary situation is for training a passenger how to drive a motorcycle. The passenger may be instructed by the driver as they safely ride behind the driver with the stability belt.

In an embodiment, the present invention provides a stability belt whereby a horseback rider may take a passenger safely on a horse having a saddle or no saddle. The passenger may be tied to the horseback rider and the horseback rider may have free use of the reins and guide the horse. Again, in such a situation, the belt may provide a useful way for training an inexperienced horseback rider how to ride.

In an embodiment, the belt may be floatable so as to be capable of serving as a life preserver if the vehicle is a jet-ski or water scooter or the driver or passenger make a water landing. The material of which the belt and padded portions are made may be floatable or automatically inflatable when landing in water via water sensors.

A stability belt thus may comprise a strap portion of predetermined width such as two or three inches and length variable with the waist of the motorcycle rider and additional length necessary to reach round a passenger of varying age. A typical length may be 42 inches, 52 inches or 62 inches. A single belt of predetermined length may be about five feet long and adjusted from 40 to 62 inches. The excess belt may be secured by an excess strap adjuster and, if required, by an additional fastener or the excess strap tucked into the belt.

Further features and advantages of the present invention, as well as the structure and assembly by a user of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 6A shows the outside rear of an embodiment of the stability belt of the present invention and FIG. 6B shows the inside rear of the belt.

DETAILED DESCRIPTION

Figure 1:
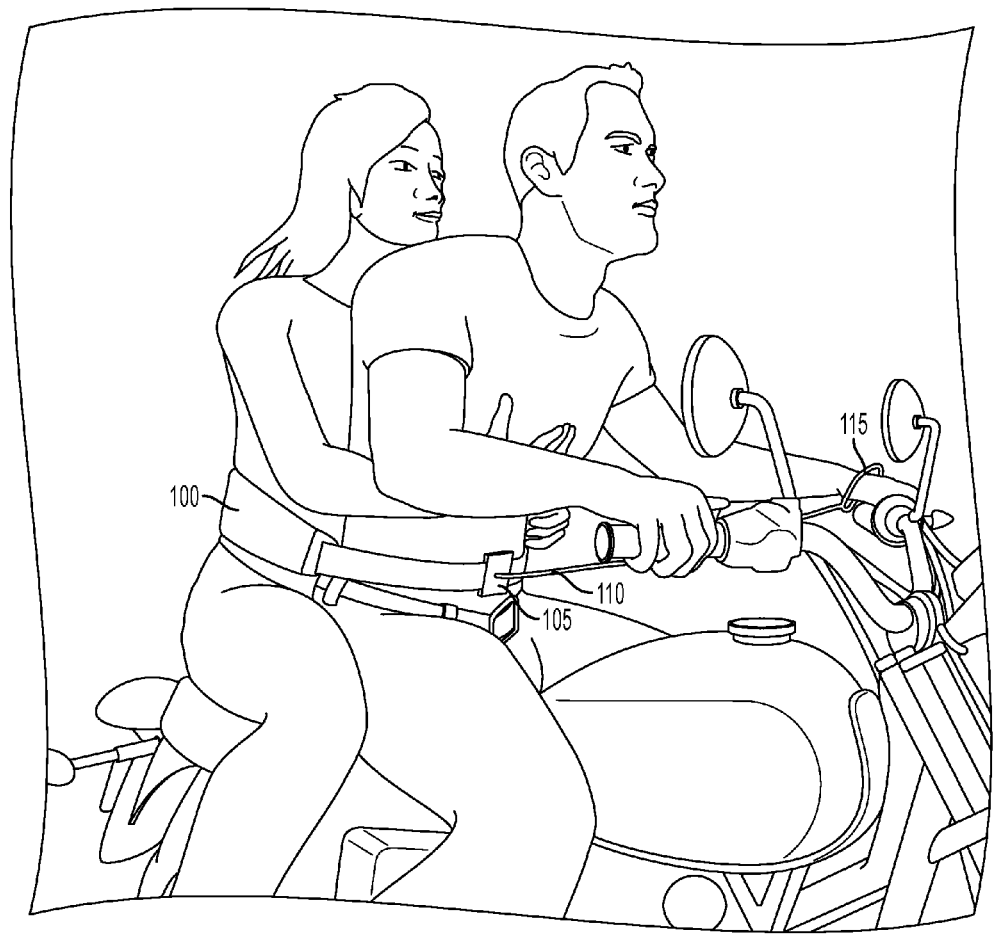
FIG. 1 is a view of a male motorcycle rider without a helmet driving a motorcycle and having a female passenger behind him. The rider and passenger are wearing an embodiment of a stability belt 100 having a quick-release, for example, spring-loaded clasp 105 that has a spring-loaded top that may be opened by the driver's left hand or arm portion from left to right in an emergency by the rider/driver raising the left hand or twisting their wrist or elbow via loop 115 of tether 110 tied between an aperture of the quick opening clasp 105 and the driver's wrist.

The present invention is directed to a stability belt intended to be used by a motorcycle driver or driver of other vehicle that is open or a horse or other domesticated animal rider when riding with a passenger. The belt has no handles for a passenger and does not require handles. To the contrary, the passenger is held by the belt to the driver and so may ride with greater stability and comfort than when having to use handles. The passenger may still, if capable, put their arms round the driver, but is not reliant on their strength to hold on. Examples of vehicles that the stability belt may be used with for the safety and comfort of rider and passenger include but are not limited to including a motorcycle, a motor scooter, a moped, an all-terrain vehicle (ATV), a snow mobile, a jet ski, a water scooter, a tractor (garden tractor or larger tractor) and the like. Examples of domesticated animals that may be ridden by a driver and passenger include a horse, mule, elephant, donkey and camel. Reference will be made to FIGS. 1-6B for describing the belt and its assembly. Similar reference numerals will be used in the drawings to indicate similar elements in FIGS. 1-4.

In an embodiment, with reference to FIG. 1, one embodiment of the present invention is intended for use by a motorcycle driver from their left arm or hand as shown. If the belt is worn upside down, the buckle 5 may be opened from the driver's right arm or hand (not shown). There is shown a male driver and a female passenger with her arms around the driver's waist. Practically speaking, a stability belt 100 may be worn by both parties in a body region extending from their waists to their upper torso's (just below the shoulders). The belt may be as wide as the torso, but, typically, should be narrow or about two inches wide. If as wide as the torso, the belt may give greater stability to a handicapped person or a child having weak hands/arms or no arms. A buckle 105 is shown work at the driver's stomach level. The buckle 105 quickly releases when the belt buckle top which is spring-loaded is raised by the tether 115. The buckle 105 releases from a clip portion which inserts into the buckle 105 and is released by pulling the spring-loaded buckle top portion up from left to right of the drawing. The driver wears a tether 110 tied to an aperture of the buckle top located close to its edge, for example, between the left edge and a half-way point. An example of a spring-loaded buckle is a buckle of a typical automobile safety seat belt which as a top that a belted passenger simply pulls on to open the belt or clicks in the clip end to fasten their seat belt.

A loop 115 of the tether may be worn round the wrist or carried in the driver's hand or gloved hand or worn about the elbow and be of sufficient size. It may be a slip loop so the loop 115 hugs the wrist, hand or arm portion of the driver at the driver's discretion. In this case, the driver, seeing an emergency condition ahead may release the buckle by moving their elbow (if looped around the arm), their wrist or their hand. Under ordinary riding conditions, the passenger is safely held to the driver of the vehicle or animal by the stability belt 100 when worn. The passenger may be handicapped or a child. A handicapped person may have no arms and still be able to ride a motorcycle. Without the stability belt, a handicapped person missing their arm extremities or portions would not be otherwise able to enjoy a motorcycle ride. Similarly, the child may not be able to reach around their parent's waist and so the parent and the child feel safer and more stable if tied to one another by stability belt 100 (rather than having the child hold on to a handle as in the prior art).

The belt 100 may be turned upside down and so able to open from right to left (as well as left to right) so the belt is adaptable for left-handed or right-handed drivers. The loop 115 may then be worn on the right arm of the driver and the buckle 105 released via the tether 110 by the right hand, the right wrist or the right arm's movement on the driver's seeing an emergency ahead. Using one's imagination, the reader will readily understand that the belt 100 may be equally used on any vehicle with handlebars such as a jet ski, moped, ATV, motor scooter or a snow mobile. Vehicles with steering wheels such as a garden tractor may need more slack and more arm motion to release the quick-release clasp 105 via tether 110. Nevertheless, a tether may be used to release a belt 100 if the vehicle has a steering wheel or the rider uses reins, whether an English, Western or bareback ride. If no tether 110 is used, the driver may reach back with one hand and release the safety belt buckle 105 by lifting up the belt buckle as in an automobile. Also, a horse is guided by reins and more slack in the tether 110 may be needed for a horseback rider and their passenger, bareback or with a saddle.

The safety, spring-loaded belt buckle may be adapted to automatically release in the event of a quick stop by incorporating a small motor circuit that releases the buckle in the event of a gyroscope detection of a sudden, extreme tilt of the driver, the vehicle or the animal (not shown). (In other words, the gyroscope may sense the vehicle or animal being "laid down" on its side and actuate a quick release of the buckle via, for example, micro-electronic motors or MEM's, not shown, to open the buckle and release the belt.)

Figure 2:
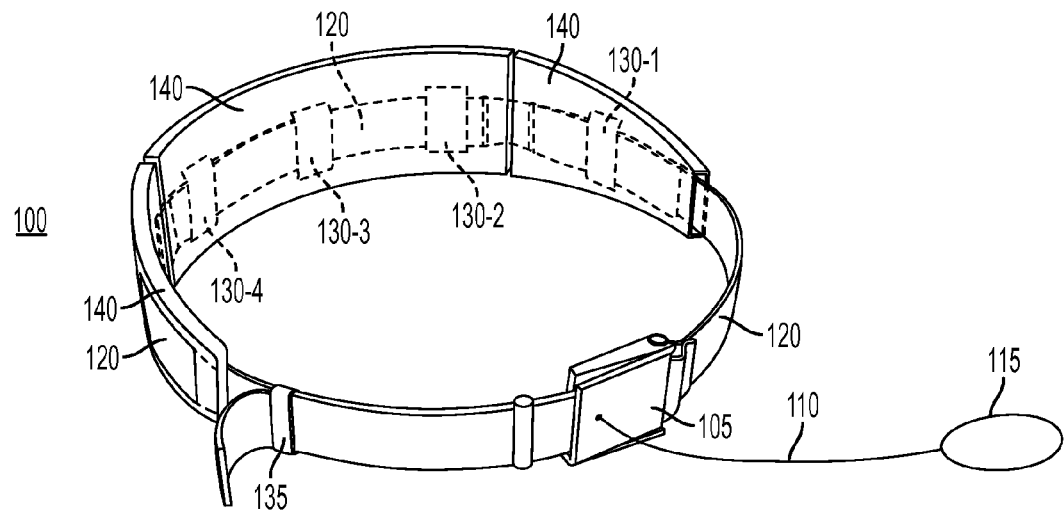
FIG. 2 is a perspective view of the security/stability belt 100 of FIG. 1 showing padded portions 140, preferably outside belt loops 130-1 to 130-4, outside excess strap adjuster 135, quick release clasp or buckle 105 having a tether 110 coupled to a loop 115 for opening the buckle. Note that outside strap 120 preferably is outside padding 120 and secured by belt loops, both the belt loops and the outside strap shown in dashed line.

In an embodiment, referring to FIG. 2, a stability belt 100 comprises a buckle 105 affixed to one end of a strap 120 of sufficient length, for example, between approximately three and a half feet and five feet in length, to reach around the joint waists (midsections) of a passenger and driver. The strap 120 may be as thin as approximately 1 inch and as thick as four, six, eight or even ten inches depending on the application. In one embodiment, a padded portion 140 and a belt 100 may be one piece and so as thick as the driver's torso. The strap 120 may be made of rope, hemp, plastic woven fiber, cotton, leather or other material that is durable and may be light weight. Excess strap may be wrapped back on the strap and fixed by an excess strap adjuster 135. The buckle 105 has a quick-release spring-loaded top with an aperture (like an automobile safety belt). The aperture may receive a tether 110 which may be a plastic string, made of leather, or comprise a cloth string or thin rope of hemp. It may be simply tied with a knot to the underside of buckle 105 spring-loaded top or be specially constructed so as to not easily pull through the aperture in the buckle 105 top.

As the strap portion 120 extends, it may pass through belt loops 130 shown in dashed line which are fixed to at least one padding portion 140. Preferably, the strap 120 is on the outside of the padding portion 140 and is shown in dashed line with the outside belt loops 130-1 to 130-4 also shown in dashed line representing the outside of the padding portion 140 or portions (but the strap may be on the inside in some applications). Three padding portions 140 are shown, one rear and one tapered portion on each side of the rear padding portion 140, but a padding portion may be continuous and the belt loop and padding may be continuous for its entire length or the width of the driver's back for cushioning the passenger and maybe the sides of the driver. In the figure, belt loop 130-1 is one of four belt loops for padding portion 140 which may have a tapered shape (being on one or the other side of the driver). The next or rear padding portion 140 may be of equal width along its length and merge with a third tapered padding portion 140. These may be pulled off the stability belt 100 and stowed when not in use. The three padding portions 140, rear and two side padding portions 140, may be bordered by hook and loop fasteners so that they stick together when the belt is assembled or pulled apart for stowage.

Figure 3:
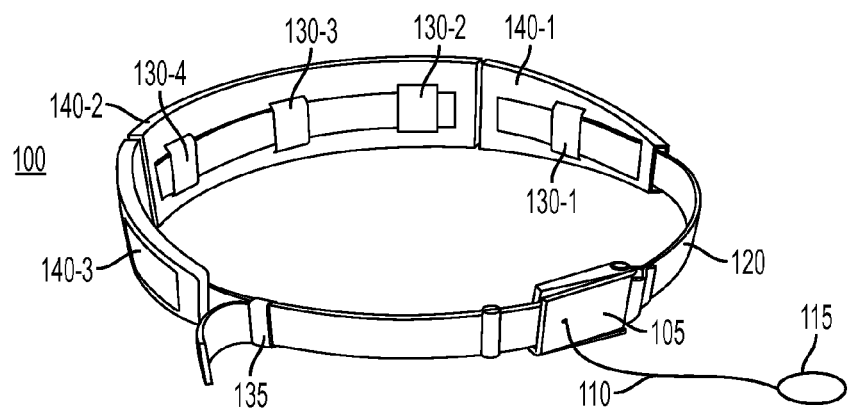
FIG. 3 is a photograph of the security/stability belt embodiment of FIG. 1 or 2 turned inside out so that the padding is on the outside of the strap 120.

FIG. 3 is essentially a photograph of the stability belt 100 of FIG. 2 showing the belt reversed so the strap is on the inside of the padding portions. The belt 100 may have a dark or black color. In one embodiment, the belt is colored with a highly visible color such as orange or yellow for night driving. The padding portion of an embodiment of stability belt 100 may be made of a floatable material or constructed of a canvas air bag. The floatation capability may have application in the event the belt is used with a jet-ski or water scooter or for whatever reason, the driver or rider of a horse or vehicle finds themselves in the water after a fall. The floatation device may automatically fill with air upon control by a passenger in the event of a water landing. An advantage of the padding 140 is that a passenger may find that the padding 140 acts like a cushion in the event of a sudden stop of the vehicle (or horse).

Figure 4A:
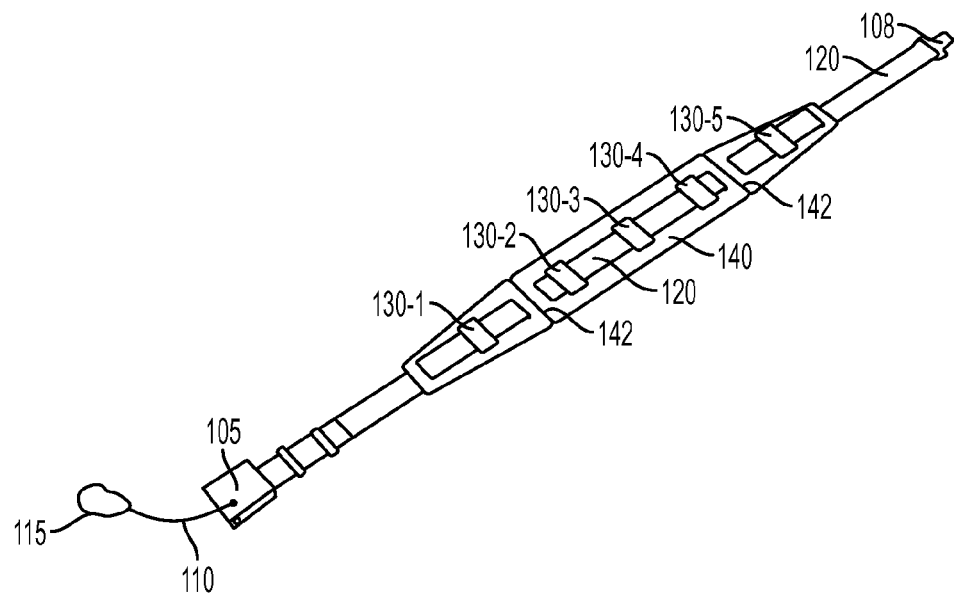
FIG. 4(A) shows an outside view of the stability belt 100 of FIG. 1, 2 or 3
Figure 4B:
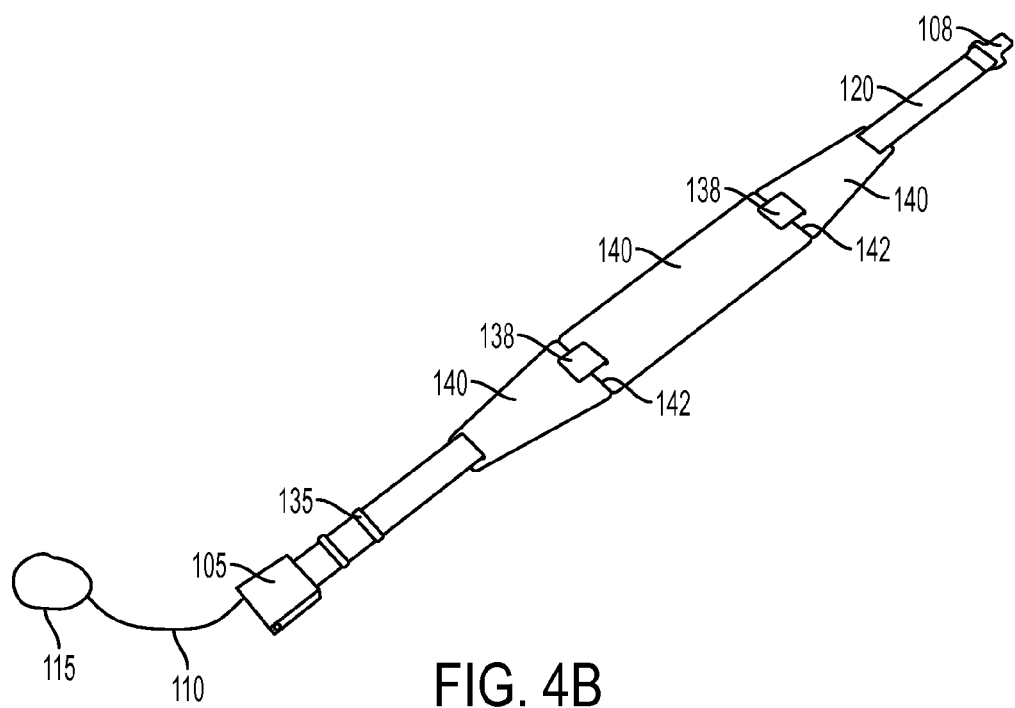
FIG. 4(B) shows an inside view of the belt.

Referring now to FIG. 4(A) outside view and FIG. 4(B) inside view, the belt 100 is seen as further comprising a clip or clasp 108 which is quickly released on pulling up the levered top spring-loaded handle of the safety buckle 105. The tether 110 is shown entering an aperture of the buckle 105 in outside view FIG. 4(A). The tether 110 on the inside view is not shown exiting because the aperture is only in the buckle top which is lifted from right to left to release clip 108 from buckle 105 in FIG. 4(B) inside view. If the padding 140 comes in three portions and is not integral with the belt 100, a belt portion 138 (inside view) of belt 120 may tie two portions together as seen in FIG. 4(B) inside view. Moreover, a fastening means 142 may be provided at the sides of the padding portions 140 to fasten the padding portions 140 together such as hook and loop fasteners (known under the trade name Velcro® fasteners) or by snaps or other fastening means known in the art. The belt portions 140 may be joined by hook and loop fasteners on their adjoining sides (not shown) to one another when the belt 100 is put together where joining the sides of the padding 140 with the back or rear (passenger) padding portion 140 prevents the tapered side portions 140 from sliding/slipping around the belt 100. The back padded portion, two side portions and belt may be disassembled, rolled and stowed.

Figure 5:
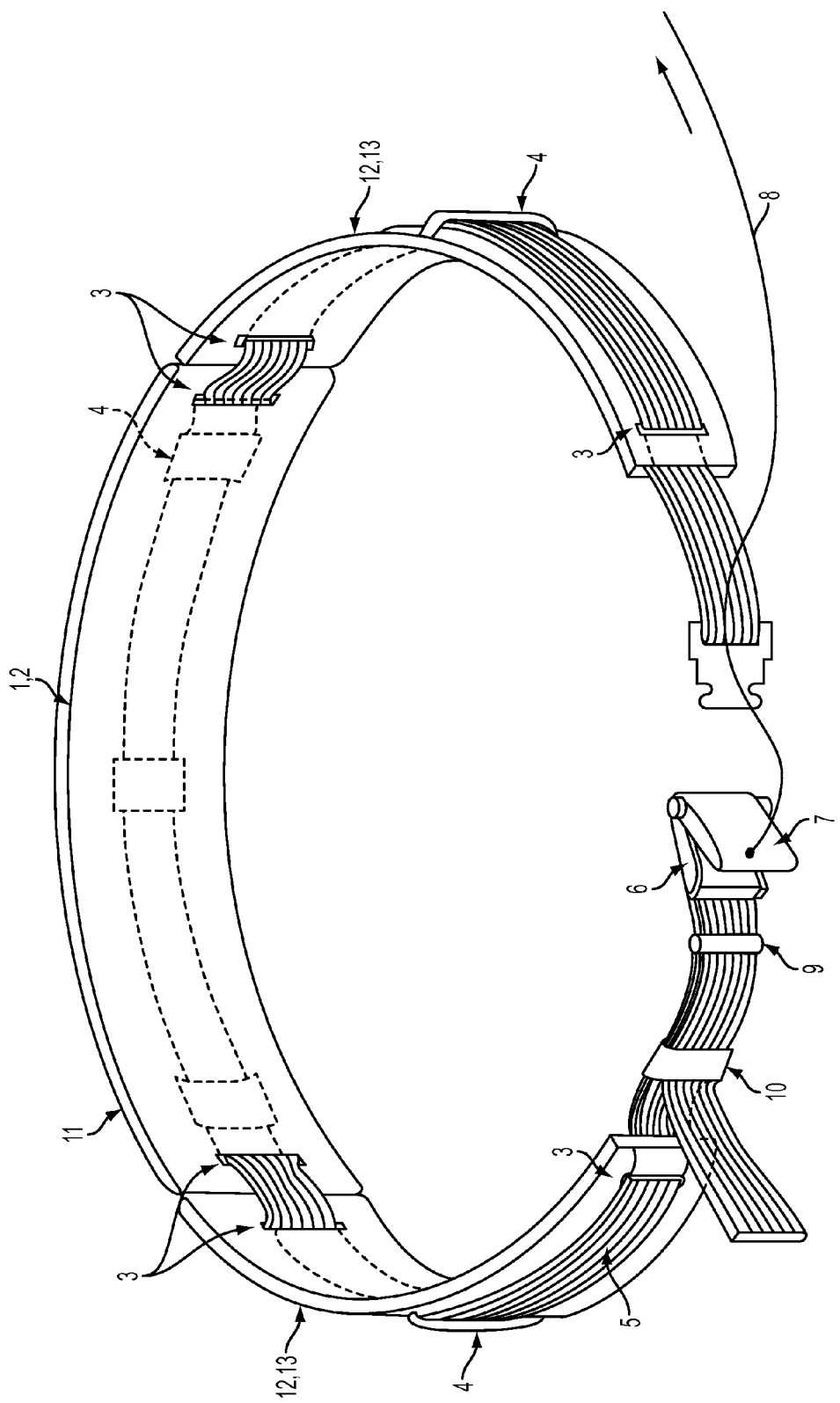
FIG. 5 shows a detailed perspective view of an embodiment of the stability belt showing a drilled hole or aperture 7 in the top of the buckle, located approximately between the edge and the center of the quick-release buckle top that may be quickly released from the clip portion upon opening using the tether 8.

Referring now to FIG. 5, further features of an embodiment of a stability belt of the invention are shown. Padded casing 1, 2 is durable, flexible, rollable and may be floatable. The padded casing 1, 2 can be rolled up compactly to fit in a motorcycle storage compartment (or a saddle bag). The padded casing may surround the belt in sections such that two sections are joined at reinforced, slotted openings 3 through the padded casing. Starting at point 6, 7, showing the spring-loaded buckle open, a strap may emerge from the buckle 6 and the excess strap can be tied by clasp 9 and excess strap gatherer 10. Then, the strap weaves into the tapered padded portion at the left at 3 comes out of a slotted hole 3 as strap 5, goes through a loop 4 and weaves its way back out and in slotted holes 3. Padding portions 12, 13 are a side padding portion that may be held to the side of the driver and passenger by the strap 5. The strap 5 then goes into the slotted hole of the back padded portion 1,2 and weaves its way through a belt loop shown in dashed line because it is on the outside of the back padded portion 1, 2 at its mid-point. There are also shown further belt loops 4 on the back padded portion and a slotted hole 3 where the strap can be seen leaving the back portion and entering a hole 3 on the right side padded tapered portion 12, 13. The strap then proceeds through a belt loop 4 and goes into a slotted hole 3 where it may emerge from the padded tapered right side portions and attach to a clip for the buckle 6, 7. So the strap 5 may weave in and out and mostly be on the outside of the tapered padded portions in this embodiment. A 1" to 3" wide belt loop 4 is exemplary of a belt loop 4 that are close-fitting. On the outside, the strap 5 may appear outside the padding to hug the padding to the waist of the driver. In one embodiment, the belt 5 may be $1\frac{5}{16}^{th}$ inch wide and 62 inches in overall length. In one embodiment, a 1967 Dodge Charger (quick release, spring-loaded) replacement lap safety seatbelt buckle 6, 7 was used with an associated clip at the other end of the belt for stability belt 100. An aperture 7 or hole was drilled in the buckle 6 to affix the safety cord or tether 8 shown going to a left hand or arm of a driver so that it may be pulled to release the belt (spring-loaded belt buckle) in an emergency. As indicated above, the belt may be worn upside down to be opened by a right handed driver. An adjuster 9 is shown for assisting in the collection of excess belt for a further loop 10 or loops to secure excess belt. A rear area of padding or padded casing 11 is straight and may be of even width. One of two areas of padded casing 12, 13 may be tapered from the width of the rear padding 11 toward the front of the belt. All three padded casings may be tied together by fastening means such as hook and loop, male and female snaps or other known equivalent means, not shown. The width of the padded casing may vary depending on the application, for example, in a floating belt, it may be both wider and thicker than in a motorcycle application.

FIG. 6A is an outside view of the rear of the belt. FIG. 6B is an inside view of the rear of the belt. The belt is open along its length and no buckle or clip are shown. The padded casing 1, 2 is durable, flexible, rollable and floatable. The padded casing can be rolled up compactly to fit in a motorcycle (or other vehicle or horse) storage compartment. The padded casing may surround the belt in sections such that two sections are joined at reinforced, slotted openings 3 through the padded casing. A 1" wide belt loop 4 is exemplary of a belt loop 4 that are close-fitting. As seen in FIG. 6A, there may be two holes for receiving strap and at least one belt loop for holding the strap to a padding portion. The rear padding portion may comprise three belt loops. On the outside, the belt 5 may appear outside the padding to hug the padding to the waist of the driver. In one embodiment, the belt 5 may be $1\frac{5}{16}$ inch wide and 62 inches in overall length. In one embodiment, a 1967 Dodge Charger (quick release) replacement lap seatbelt buckle 6 was used with an associated clip at the other end of the belt. An aperture 7 or hole was drilled in the buckle to affix the safety cord or tether 8 shown going to a left hand or arm of a driver so that it may be pulled to release the belt in an emergency. An adjuster 9 is shown for assisting in the collection of excess belt for a further loop 10 or loops to secure excess belt. A rear area of padding or padded casing 11 is straight and may be of even width. One of two areas of padded casing 12, 13 may be tapered from the width of the rear padding 11 toward the front of the belt. The width of the padded casing may vary depending on the application, for example, in a floating belt, it may be both wider and thicker than in a motorcycle application.

There are times when operators of mini-bikes, motorcycles, jet-skis, water scooters, ATV's, snowmobiles and horses would like to take a passenger for a ride but do not trust that the passenger can hang on safely. Statistics have shown in Pennsylvania that motorcycle passengers may be killed in an accident and a known way of providing safety for them is to provide handles. Children and those with physical limitations may not be able to hold on tightly for an extended period of time. It may be impossible for many veterans or accident victims to wrap their arms around the vehicle operator or stay well-balanced when riding if they are missing limbs. Knowing that there are many who like to ride if there were a safe and stable way that the passengers could be secured to the operator, the present invention may provide such safety, comfort and stability. Any excess strap is rolled up and tucked into the strap when work so that it does not flap in the wind or is gathered into the excess strap collectors. The strap may have some elasticity when worn to provide greater comfort but should not be so stretchable as to defeat the stability and safety the stability belt provides. The stability belt may be used when teaching a passenger how to ride or drive or operate. Other features may come to mind to one of ordinary skill in the art from reading the above description which should only be considered limited by the claims which follow.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A stability belt adapted to be worn by a passenger and driver of one of an open vehicle and a domesticated animal, the stability belt comprising a length of strap sufficiently long and adapted to extend around both the driver and passenger, the stability belt adapted to tie the passenger and the driver together when worn, the belt having a spring-loaded, quick release buckle and clip on one or the other end adapted to be located at a front waist of the driver, the quick release buckle having a spring-loaded top for quick release of the belt buckle and belt from the driver and passenger in an emergency condition, the spring-loaded top opening from one edge to another and having an aperture for receiving a tether, the aperture being located between one half of the width of the top and the opening edge of the top.

2. The stability belt of claim 1 further comprising a padded portion adapted to cushion an impact of the driver and the passenger on a sudden stop of the open vehicle or the domesticated animal.

3. The stability belt of claim 2 wherein the padded portion comprises a constant width back portion and two tapered side portions adapted to comprise belt loops for sliding the strap through the padded portion.

4. The stability belt of claim 3 wherein a fastening means is provided on each side of the back padded portion and on a corresponding side of each of the two tapered padded side portions, the fastening means adapted for joining the back padded portion and the two tapered padded side portions together.

5. The stability belt of claim 4, the stability belt being adapted to be assembled via the belt loops and the fastening means from a stability belt portion including the buckle and clip at either end, the two tapered side padded portions with belt loops and the predetermined width back portion, and to be disassembled for stowage.

6. The stability belt of claim 5 the stability belt adapted, when worn, to permit the length of strap to be woven through the tapered side padded portions and predetermined width back portion such that the strap and belt loops are on an exterior side of the padded portions from the passenger and the driver.

7. The stability belt of claim 1 further comprising the tether adapted to fit through the aperture and be connected at one end to the buckle and having a loop at the other end.

8. The stability belt of claim 1 being of a predetermined length of approximately five feet adapted to reach around the passenger and the driver.

9. The stability belt of claim 8 further comprising an excess strap adjuster for gathering excess strap when the stability belt is worn by the driver and the passenger.

10. The stability belt of claim 1 having a fixed length of approximately 42 inches.

11. The stability belt of claim 1 having a fixed length of approximately 52 inches.

12. The stability belt of claim 1 having a fixed length of approximately 62 inches.

13. A stability belt adapted to be worn by a passenger and driver of one of an open vehicle and a domesticated animal that may be ridden, the stability belt comprising a length of strap sufficiently long and adapted to extend around both the driver and passenger, the stability belt adapted to tie the passenger and the driver together when worn, the belt having a spring-loaded, quick release buckle and clip on one or the other end adapted to be located at a front waist of the driver, the stability belt further comprising a gyroscope for detecting a sudden and extreme tilt of the driver, the passenger, the vehicle or the domesticated animal, the quick release buckle being configured to release automatically when the gyroscope detects the sudden and extreme tilt.

14. The stability belt of claim 13 further comprising a padded portion adapted to cushion an impact of the driver and the passenger on a sudden stop of the open vehicle or the domesticated animal.

15. The stability belt of claim 14 wherein the padded portion comprises a constant width back portion and two tapered side portions adapted to comprise belt loops for sliding the strap through the padded portion.

16. The stability belt of claim 15 wherein a fastening means is provided on each side of the back padded portion and on a corresponding side of each of the two tapered padded side portions, the fastening means adapted for joining the back padded portion and the two tapered padded side portions together.

17. The stability belt of claim 16, the stability belt being adapted to be assembled via the belt loops and the fastening means from a stability belt portion including the buckle and clip at either end, the two tapered side padded portions with belt loops and the predetermined width back portion, and be disassembled for stowage.

18. The stability belt of claim 13 being of a predetermined length of between approximately three feet and five feet and adapted to reach around the passenger and the driver.

19. The stability belt of claim 18 further comprising an excess strap adjuster for gathering excess strap when the stability belt is worn by the driver and the passenger.

* * * * *